United States Patent

[11] 3,588,191

[72] Inventors Rupert L. Atkin
Grosse Pointe Woods; Gilbert H. Drutchas, Birmingham, both of Mich.
[21] Appl. No. 822,439
[22] Filed May 7, 1969
[45] Patented June 28, 1971
[73] Assignee TRW Inc.
Cleveland, Ohio

[54] FOUR WHEEL SKID CONTROL SYSTEM
10 Claims, 1 Drawing Fig.

[52] U.S. Cl. ...................................................... 303/21,
188/181, 303/2, 303/6, 303/63
[51] Int. Cl. ........................................................ B60t 8/06,
B60t 8/26, B60t 11/12
[50] Field of Search ........................................... 303/6, 6
(C), 61—63, 68—69, 21, 10, 24, 2; 188/181

[56] References Cited
UNITED STATES PATENTS

| | | | |
|---|---|---|---|
| 3,004,801 | 10/1961 | Wrigley | 303/21UX |
| 3,032,995 | 5/1962 | Knowles | 303/21UX |
| 3,124,220 | 3/1964 | Kell | 303/21X |
| 3,276,822 | 10/1966 | Lister et al. | 303/21UX |

*Primary Examiner*—Milton Buchler
*Assistant Examiner*—John J. McLaughlin
*Attorney*—Hill, Sherman, Meroni, Gross & Simpson ABSTRACT: A four wheel hydraulic skid control valving system including a pump for developing a fluid pressure which is proportional to the speed of at least one of the vehicle wheels and means for coupling the fluid pressure from the pump directly to both the rear wheel cylinders and the front wheel cylinders of a four wheel braking system. Fluid pressure from the pump is normally bypassed through a pump return and accordingly does not build up sufficient pressure to actuate the wheel brake cylinders. However, when braking is desired, the operator depresses the braking pedal and fluid pressure from the rear master cylinder is applied to a spool valve which in turn moves in such a way as to throttle the flow of fluid to the pump return thereby increasing the fluid pressure in the system to a point sufficient to actuate the respective wheel cylinders. A crossover valve is provided in both the rear braking and the front braking portions of the system. The crossover valves are normally biased by fluid pressure from the respective sections of the master cylinder to close off the flow of fluid from the pump to the wheel brakes. However, when the pump pressure is sufficiently high as is the case when the vehicle is in motion, the pump pressure overcomes the pressure of the respective sections of the master cylinder to maintain the crossover valves in an open condition. This is not because the pump pressure exceeds the master cylinder pressure but rather because the effective areas facing the pump pressure and the master cylinder pressure are approximately seven to one with the larger area facing the pump fluid pressure. Such a system is fail-safe since the crossover valves will move into position for closing off the flow of pump fluid when the pump pressure is too low and at the same time will couple the master cylinder fluid directly to the rear and front brake lines so that normal manual braking can be achieved.

PATENTED JUN28 1971        3,588,191
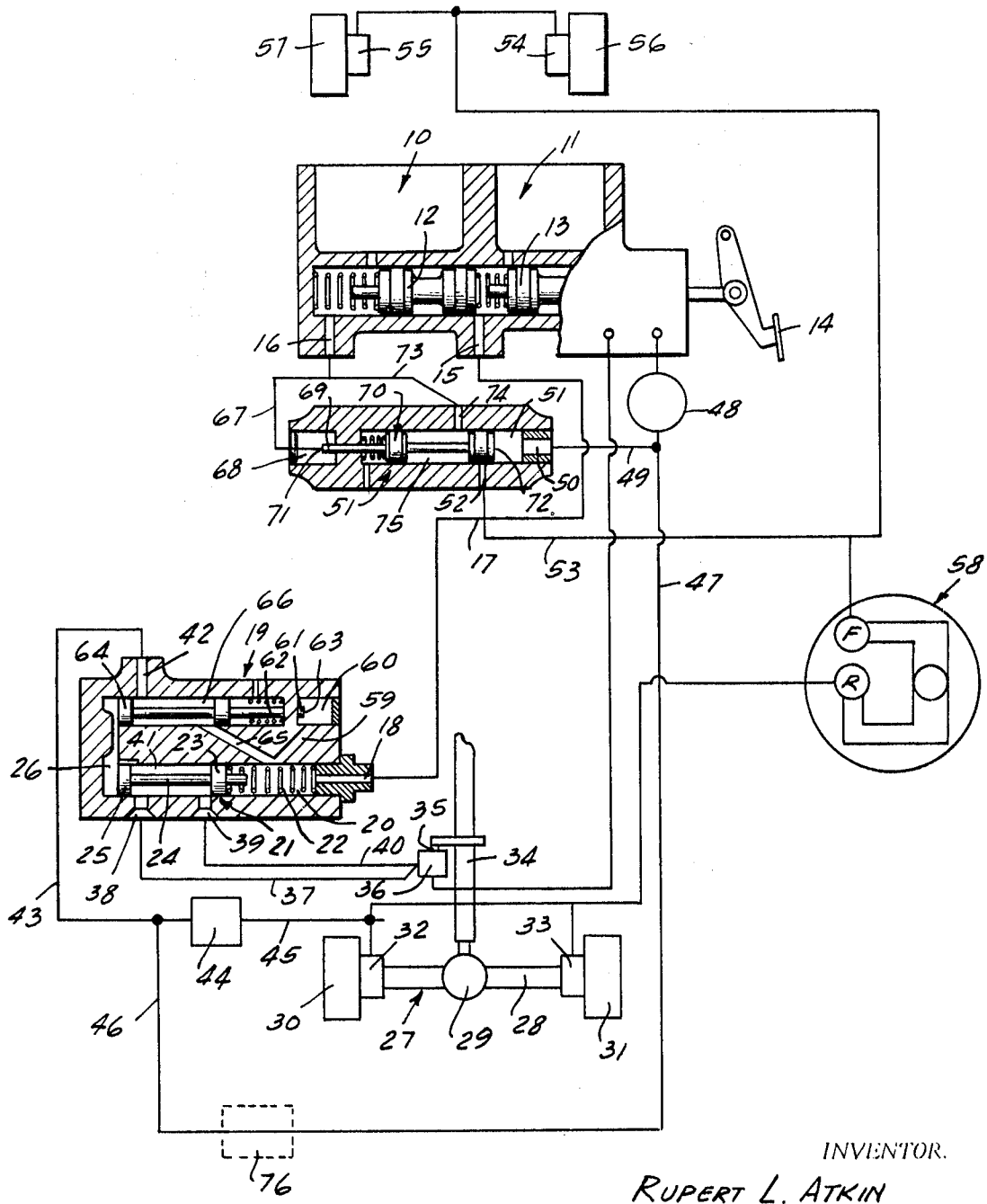
INVENTOR.
RUPERT L. ATKIN
GILBERT H. DRUTCHAS
BY Hill, Sherman, Meroni, Gross & Simpson ATTORNEYS

FOUR WHEEL SKID CONTROL SYSTEM

BACKGROUND OF THE INVENTION

Field of the Invention

The field of art to which this invention pertains is skid control systems and in particular to hydraulic skid control systems which are applicable to four wheel hydraulic braking devices and which utilize pump pressure generated by the speed of the wheels as both the sensor for the wheel brakes and as the means for actuating the wheel brakes directly.

SUMMARY OF THE INVENTION

It is an important feature of the present invention to provide an improved hydraulic four wheel skid control system.

It is another feature of the present invention to provide a valving system for a hydraulic four wheel skid control system.

It is an important object of the present invention to provide means for utilizing fluid pressure from a pump as both a sensor and as a means for actuating both the rear wheel cylinders and the front wheel cylinders.

It is another object of the present invention to provide a valving system for use in conjunction with a front brake master cylinder section and a rear brake master cylinder section.

It is another object of the present invention to provide a single throttling valve for a hydraulic skid control system adapted to control the braking action of four wheels of a vehicle.

It is also an object of the present invention to provide a hydraulic skid control system as described above using a single throttling valve for throttling the pump return to increase the fluid pressure within the system and utilizing a pair of crossover valves, one each for the rear and front portions of the braking system.

It is an additional feature of the present invention to provide a four wheel antiskid braking system utilizing a crossover valve in both the rear and front portions of the system and, coupling the rear and front master cylinder section pressures to the crossover valve in such a way as to assure fail-safe operation in the event the pump pressure generated by the speed of the vehicle wheels becomes insufficient to operate the wheel brakes.

These and other objects, features and advantages of the present invention will be understood in greater detail from the following description and the associated drawing wherein reference numerals are utilized to designate an illustrative embodiment.

BRIEF DESCRIPTION OF THE DRAWING

The single sheet of drawings of the present invention shows a schematic of a fluid circuit and valving system associated with the four wheel hydraulic antiskid device of the present invention and in particular shows the use of a throttling valve to increase the pump output pressure when braking is desired and to apply that pressure to both the rear and front wheel brake cylinders. The single FIGURE of the present invention also shows the use of a pair of crossover valves, one associated with the rear and one with the front portion of the braking system and providing fail-safe operation in the event of reduced pump output during forward motion of the vehicle.

DESCRIPTION OF THE PREFERRED EMBODIMENT

The antiskid brake control system of the present invention utilizes pump pressure generated by the rotation of one or more of the vehicle wheels. The pump pressure so generated is applied to a pump return and is absorbed at the low pressure side of the pump when braking is not desired. However, when braking is desired, a throttling valve is provided to throttle the return of pump fluid to the pump and thereby increase the pressure of the pump output. This increased pump output pressure is then applied to a fluid circuit which is coupled directly to the rear wheel brake cylinders and to the front wheel brake cylinders.

In such a system the fluid pressure generated by the pump acts as a speed sensor and is sensitive to the speed of rotation of the vehicle wheels. This fluid is also the brake actuator and is used to operate the wheel brake cylinders thereby slowing down the vehicle wheels which are generating the pump pressure. Accordingly this is a closed loop fluid mechanical system with the pump pressure decreasing as the speed of the vehicle wheels tend toward a lock condition. As the wheels approach a lock condition, the pump pressure is low, and the brakes are automatically partially released.

It is apparent that in such a system a fail-safe procedure is required. In the present invention, a pair of crossover valves is utilized in both the front and rear brake portions of the hydraulic antiskid fluid valving circuit. Normally the respective crossover valves are biased in one direction by the pump output and are biased in the opposing direction by fluid pressure from the respective master cylinders. The pump pressure is normally lower than the master cylinder pressure and could not normally overcome the opposing action of the master cylinder pressure against the crossover valve. Accordingly the crossover valve is provided with a considerably smaller work area facing in the direction of the master cylinder pressure than is facing in the direction of the pump pressure. In this way the pump pressure can and does overcome the master cylinder pressure on the crossover valve and normally keeps the crossover valve in a position to allow a continuous flow of pump pressure from the pump to the respective wheel brake cylinders during braking.

However, during braking when the pump pressure falls below that which is sufficient to operate the wheel brake cylinders, the crossover valves will be moved by their respective pressures from the master cylinders. The crossover valves will move into a position to couple the fluid from the respective master cylinder sections directly into the hydraulic brake line and thereby provide manual braking in the event of failure of the pump or of the throttling valve.

Referring to the drawing in detail, front and rear master cylinder sections 10 and 11 are illustrated generally and include a pair of pistons 12 and 13 which are actuated by a manual brake pedal 14. The outlet from the rear master cylinder is illustrated at numeral 15, while the outlet from the front master cylinder section is illustrated by the numeral 16. Pressure from the master cylinder outlet 15 is fed through a line 17 to an inlet 18 of a rear hydraulic valving device 19. The valving device 19 has a cavity 20 and fluid from the inlet 18 is fed into the cavity 20. A spool valve 21 is illustrated generally and is biased toward the left by a coil spring 22 and by pressure received within the cavity 20. The spool valve has a radially enlarged portion 23 which is carried by a rod 24. A second radially enlarged portion 25 is formed at the opposing end of the rod 24 and extends into a cavity 26.

The rear end portion of the vehicle is indicated generally by the reference numeral 27 and includes a rear axle 28, a differential 29, a pair of rear wheels 30 and 31 and rear wheel brake cylinders 32 and 33. The differential is coupled to a drive shaft 34 which in turn is geared as at 35 to a pump 36. The pump 36 has an outlet 37 which is coupled to an inlet 38 of the rear valving device 19. The valving device 19 has a pump return 39 which is coupled directly to the low pressure side 40 of the pump 36.

Under normal circumstances when braking is not desired, pressure flows from the pump through the inlet 38 and a cavity 41 to the pump return 39 and hence to the low pressure side of the pump. However, when braking is desired, the brake pedal 14 is actuated and the master cylinder section 11 generates an output pressure through the line 17 into the inlet 18 and the cavity 20 for moving the spool valve 21 to the left thereby throttling the pump return outlet 39. This throttling action increases the pressure of fluid within the cavity 41 and hence within the cavity 26. The pump pressure then passes through an outlet 42 and a fluid line 43 through a proportioning valve 44 and a further fluid line 45 to the rear brake cylinders 32 and 33. The proportioning valve 44 is a stepdown pressure valve which allows a decrease in pressure at the rear brakes as opposed to the front brakes due to the proportionately heavier loading of the front portion of the vehicle during panic stops and the nonenergizing brakes frequently used.

The fluid pressure from the line 43 then branches to a pressure line 46 and to a further line 47 and is coupled directly to an accumulator 48 which may be used to supply pressure to the master cylinder to boost or to provide a power action in connection with the operation of the brake pedal 14.

Pressure from the line 47 then branches to a line 49 and is coupled through an inlet 50 of a valving device 51 associated with the front portion of the fluid circuit.

Fluid from the inlet 50 is received within a cavity 51 and passes directly out an outlet 52 through a circuit line 53 directly to the front wheel cylinders 54 and 55 which are associated with front wheels 56 and 57. Suitable lights or signals 58 may be supplied to indicate the presence or absence of fluid pressure within the respective lines associated with the rear and front brakes respectively as shown.

In the remote event pressure from the pump 36 is too low to actuate the brakes, pressure from the master cylinder section 11 will be received through the lines 17 and 18 into the cavity 20 and via a passageway 59 into a further cavity 60. A portion 61 of a piston 62 extends into the cavity 60 and provides an end face 63 upon which fluid pressure can act to move the piston to the left in the diagram. Movement of the piston to the left causes a radially enlarged portion 64 to cut off the flow of fluid from the pump to the outlet 42 and to couple the master cylinder pressure which is received via a passageway 65 into an inner cavity 66. This fluid then passes directly from the cavity 66 through the outlet 42 and into the braking system. Accordingly, the device shown provides a fail-safe feature in that failure of the fluid pump or failure of the pump to build up pressure due to proper throttling action is protected by the crossover valves 62 and 70 which closes the flow of fluid from the pump and opens the flow of fluid directly from the master cylinder to provide for normal manual operation of the brakes.

The front master cylinder section 10 has an outlet 16 which is coupled through a line 67 to a cavity 68. An end portion 69 of a crossover valve 70 is received within the cavity and has an end face 71 exposed to pressure therein. Pressure within the cavity 68 causes the crossover valve to move to the right in the absence of pressure within the cavity 51. In other words, the crossover valve 70 is subjected to pressure from the pump 36 as received within the cavity 51 and is subjected at the opposite side to pressure from the front master cylinder section 10 as received within the cavity 68. Normally during brake application due to the small area 71 as compared to an area 72, the pump pressure moves the piston to the left against the pressure of the master cylinder. However, should the pump pressure fall below the minimum level, the master cylinder pressure would move the piston to the right, closing off the passage of pressure from the inlet 50 to the outlet 52 and allowing front master cylinder pressure to be coupled directly from the outlet 16 through a line 73 to an inlet 74 and through a cavity 75 directly to the outlet 52. This means that master cylinder pressure from the front master cylinder will then be coupled directly to the line 53 and hence directly to the front wheel brake cylinders 54 and 55 thereby assuring complete fail-safe features.

It should be noted that the proportioning valve 44 which has been stated to provide a stepdown pressure could also be used in modified form in the position 76 to provide a step-up pressure. In either event, the proper ratio of braking effort as between the front and rear wheels is achieved.

The above-described braking system therefore provides an antiskid hydraulic system which is a closed loop system between the mechanical drive for the fluid pump 36 and the use of the output of the fluid pump to operate a braking system for the wheels which in turn provides the mechanical drive for the pump. In other words, as the wheels tend to lock, the pump pressure is reduced and the wheel brake cylinders are accordingly released thereby achieving the principal aim of an antiskid control system, namely preventing wheel lock conditions. Also, the above apparatus provides improved valving circuitry for utilizing the normal master cylinder action to operate the antiskid controls and to provide crossover valves for fail-safe features.

We claim:
1. In a vehicle having a pair of front and a pair of rear wheels and brake motor means for braking each of the wheels, a four wheel hydraulic skid control circuit comprising:
   rear and front brake master cylinders,
   a pump generating hydraulic pressure proportional to the speed of at least one of the vehicle wheels,
   a pump return normally absorbing the flow from said pump,
   means coupling the output of said pump to the rear brake motor means,
   first valve means actuatable from the rear master cylinder section for throttling the pump return thereby increasing the pressure to the rear brake motor means,
   circuit means coupling fluid pressure from the front brake motor means to the rear brake motor means,
   a first crossover valve to normally close off the pump output from the rear brake motor means in the absence of throttling of said pump return,
wherein rear master cylinder section pressure is coupled to said first crossover valve to bias the same in a direction for closing off the pump output from the rear brake motor means and for coupling the master cylinder pressure directly to the rear brake motor means.

2. A four wheel hydraulic skid control circuit in accordance with claim 1 wherein the pump output pressure during throttling is sufficient to overcome the biasing force on said first crossover valve thereby holding said pump output open to said rear brake motor means.

3. A four wheel hydraulic skid control circuit in accordance with claim 2 wherein a second crossover valve is provided in said circuit, said second crossover valve being biased by said master cylinder pressure in a direction for closing said pump output from said front brake motor means in the absence of pressure from said pump and for opening the flow of pressure from said front master cylinder directly to the front brake motor means.

4. A four wheel hydraulic skid control circuit in accordance with claim 3 wherein the pump output pressure during throttling of said pump return is sufficient to overcome the biasing of said second crossover valve and maintain communication between said pump output and the front brake motor means.

5. In a vehicle having a pair of front and a pair of rear wheels and brake motor means for braking each of the wheels, a four wheel hydraulic skid control circuit comprising:
   pump means for generating a fluid pressure braking force,
   means for rotating the pump in proportion to the speed of at least one of the vehicle wheels,
   means coupling the pump output to the front and rear brake motor means,
   means providing a pump return so that the pump output is a minimum when the flow is directed through said return,
   valve means for throttling said pump return when braking is desired thereby increasing the pump output pressure to said brake motor means, and
   proportioning means disposed intermediate the pump output and one of the front and rear brake motor means for increasing the pump output pressure to the front brake motor means relative to the pressure applied to the rear brake motor means.

6. An hydraulic skid control for a wheeled vehicle with hydraulic power braking comprising,
   means forming a first hydraulic circuit,
   pump means in said first circuit driven as a function of wheel speed to drive fluid through said first circuit at increased pressure,
   brake motor means in said first circuit for receiving fluid at increased pressure to brake the wheels of the vehicle, throttle valve means in said first circuit having a recirculating flow path through which the fluid at increased pressure is recirculated to said pump and having a movable valve in control of said recirculating flow path, means forming a second hydraulic circuit, an operator actuated master cylinder for selectively supplying master cylinder pressure to said second circuit, means for applying master cylinder pressure to said movable valve of said throttle valve means for closing off said recirculating flow path whereupon pump pressure is supplied to said brake motor means for braking, and crossover valve means controlling a crossover between said first and second circuits for a fail-safe operation, said crossover valve means being biased in one direction by pressure in said first circuit but operating in the absence of such pressure to direct master cylinder pressure from said second circuit into said first circuit, thereby to insure operation of the brake motor means.

7. An hydraulic skid control as defined in claim 6 wherein said pump means comprises a single pump, and wherein said wheeled vehicle includes a plurality of wheels and wherein said brake motor means includes a corresponding plurality of brake motors, one for each wheel.

8. An hydraulic skid control as defined in claim 6 wherein said wheeled vehicle includes a plurality of wheels and wherein said brake motor means includes a corresponding plurality of brake motors, one for each wheel, and proportioning means disposed in said first circuit between the pump means and the brake motor means for proportioning the pressure between the respective brake motors.

9. An hydraulic skid control as defined in claim 8 wherein the plural wheels includes front and rear wheels and said proportioning means is constructed and arranged to proportion the pressure between the corresponding front and rear brake motors.

10. An hydraulic skid control as defined in claim 6 wherein said master cylinder comprises a dual master cylinder delivering master cylinder pressure to two separate paths corresponding to front and rear braking systems, said crossover valve means comprising separate front and rear crossover valve units, and said brake motor means comprises corresponding front and rear brake motors, whereby the corresponding front and rear systems will operate similarly but independent of one another.